(12) United States Patent
McCurter

(10) Patent No.: US 9,441,696 B2
(45) Date of Patent: Sep. 13, 2016

(54) CUSHIONING SYSTEM FOR TRAILER DRAWBAR

(71) Applicant: Premier Equipment, Inc., Tualatin, OR (US)

(72) Inventor: Zachery McCurter, Tualatin, OR (US)

(73) Assignee: Premier Equipment, Inc., Tualatin, OR (US)

( * ) Notice: Subject to any disclaimer, the term of this patent is extended or adjusted under 35 U.S.C. 154(b) by 0 days.

(21) Appl. No.: 14/290,097

(22) Filed: May 29, 2014

(65) Prior Publication Data

US 2015/0345582 A1     Dec. 3, 2015

(51) Int. Cl.
| F16F 3/087 | (2006.01) |
| F16F 1/44 | (2006.01) |
| B60D 1/02 | (2006.01) |
| B60D 1/24 | (2006.01) |
| B60D 1/50 | (2006.01) |

(52) U.S. Cl.
CPC ............ *F16F 3/0873* (2013.01); *B60D 1/02* (2013.01); *B60D 1/249* (2013.01); *B60D 1/50* (2013.01); *F16F 1/445* (2013.01); *F16F 3/0876* (2013.01)

(58) Field of Classification Search
CPC ........ F16F 1/371; F16F 3/087; F16F 3/0873; F16F 3/0876; F16F 1/44; F16F 1/445; B60D 1/50; B60D 1/249; B60D 1/14; B60D 1/143
See application file for complete search history.

(56) References Cited

U.S. PATENT DOCUMENTS

| 1,343,908 | A | * | 6/1920 | Edstrom | 280/453 |
| 1,612,191 | A | * | 12/1926 | Hubbard | 280/503 |
| 1,654,939 | A | * | 1/1928 | Loebs | 280/482 |
| 1,850,310 | A | * | 3/1932 | Ainslie | 280/487 |
| 2,189,170 | A | * | 2/1940 | Gaussoin | 280/124.121 |
| 2,371,662 | A | * | 3/1945 | Winters | 280/506 |
| 2,459,458 | A | * | 1/1949 | Schmitz | 280/487 |
| 2,513,932 | A | * | 7/1950 | Grube | 280/485 |
| 2,551,457 | A | * | 5/1951 | Oerman | 180/14.5 |
| 2,783,039 | A | * | 2/1957 | Wilson | 267/138 |
| 3,000,652 | A | * | 9/1961 | Hawkins | 280/406.1 |
| 3,169,783 | A | * | 2/1965 | Harbers et al. | 280/485 |
| 3,904,226 | A | * | 9/1975 | Smalley | 280/486 |
| 3,977,699 | A | * | 8/1976 | Wagatsuma | B60D 1/04 280/477 |
| 4,978,133 | A | * | 12/1990 | Thorne et al. | 280/484 |
| 5,380,030 | A | * | 1/1995 | Gullickson | 280/486 |
| 6,112,691 | A | * | 9/2000 | Bajeli et al. | 114/230.1 |
| 6,142,500 | A | * | 11/2000 | Sargent | 280/405.1 |
| 6,260,873 | B1 | * | 7/2001 | Bishel et al. | 280/486 |
| 6,286,851 | B1 | * | 9/2001 | Sargent | 280/455.1 |
| 6,443,437 | B1 | * | 9/2002 | Beyene et al. | 267/64.26 |

(Continued)

*Primary Examiner* — Joseph Rocca
*Assistant Examiner* — Maurice Williams
(74) *Attorney, Agent, or Firm* — Klarquist Sparkman, LLP

(57) ABSTRACT

A trailer drawbar has a housing with a cylindrical outer chamber and a cylindrical inner chamber separated from one another by a stop. First and second compressible bushings respectively fit in the outer and inner chambers. The bushings have aligned bores. A rod extends through the bores in the bushings. One rod end contains an annular base, which abuts the first bushing, and a drawbar eye. The other rod end is threaded. An annular seal is positioned on the rod adjacent to the second bushing. The first bushing has a length and compressibility such that the seal remains entirely within the inner chamber when the first bushing is compressed to a pre-determined level. The second bushing has a length and compressibility such that the first seal is not located completely inside of the inner chamber when the second bushing is compressed up to a second pre-determined level.

10 Claims, 5 Drawing Sheets

(56) References Cited

U.S. PATENT DOCUMENTS

2003/0030248 A1* 2/2003 Jerry ............................. 280/486
2007/0262561 A1* 11/2007 Rehme ......................... 280/483
2010/0032544 A1* 2/2010 Tsakiris ....................... 248/610
2011/0272908 A1* 11/2011 Tempelman et al. .. 280/124.121

* cited by examiner

CUSHIONING SYSTEM FOR TRAILER DRAWBAR

BACKGROUND

Referring to FIG. 1 of the drawings, prior art trailer couplings have a drawbar 10 with an eye 12 at the end. The drawbar is attached to the trailer and the eye fits over the pintle of a hitch which is attached to the tractor or a lead trailer. The drawbar is loaded relative to the trailer in one direction when the trailer is being pulled by the tractor or a lead trailer, and in particular when the tractor is accelerating. The drawbar is loaded in the opposite direction when the tractor is decelerating. In order to cushion this loading and unloading the drawbar is mounted in a housing 14 which is attached to the trailer. The housing has an outer cylindrical chamber which opens out of the front of the housing and an inner cylindrical chamber which opens out of the rear of the housing. The inner and outer chambers are separated from one another by a partial wall 18. The chambers have elastomeric bushings located in them. A first bushing 16a cushions movement of the drawbar when the drawbar is being pushed toward the trailer, and a second bushing 16b cushions movement of the drawbar when the drawbar is being pulled away from the trailer.

Referring now to FIG. 2, the second bushing 16b extends between the wall 18 and a metal washer 20 which is attached to the threaded end of the drawbar by a nut 22. In the prior art couplings the second bushing must extend out of the housing sufficiently that the washer never enters the housing because a metal washer will damage the housing and a metal washer is necessary to withstand the action of the nut being tightened on the drawbar and provide adequate surface area to contact the entire outer face of the bushing.

Referring now to FIG. 2a, because the second bushing 16b extends out of the housing 14, when the second bushing 16b is compressed a portion of it bulges out of the gap between the housing and the washer, A. With repeated loading this portion of the bushing prematurely wears out. Likewise, the other end of the second bushing bulges between the partial wall 18 and the central drawbar rod 23, B. This also causes the bushing to prematurely wear out.

SUMMARY OF THE INVENTION

The subject invention provides a first annular polymer seal which fits over the drawbar between the washer and the second bushing. The outer diameter of the first seal is sized such that the first seal will fit into the housing. The first bushing has a length and compressibility such that the seal remains entirely within the second chamber when the first bushing is compressed up to a first pre-determined maximum level. In addition, the second bushing has a length and compressibility such that the metal washer does not reach the housing when the second bushing is compressed up to a second pre-determined level.

In an alternative embodiment, a second polymer seal, similar to the first polymer seal, is placed on the drawbar between the second bushing and the wall.

The foregoing and other objectives and features of the invention will be more readily understood upon consideration of the following detailed description of the invention, taken in conjunction with the accompanying drawings.

DETAILED DESCRIPTION OF PREFERRED EMBODIMENTS

Figure 1:
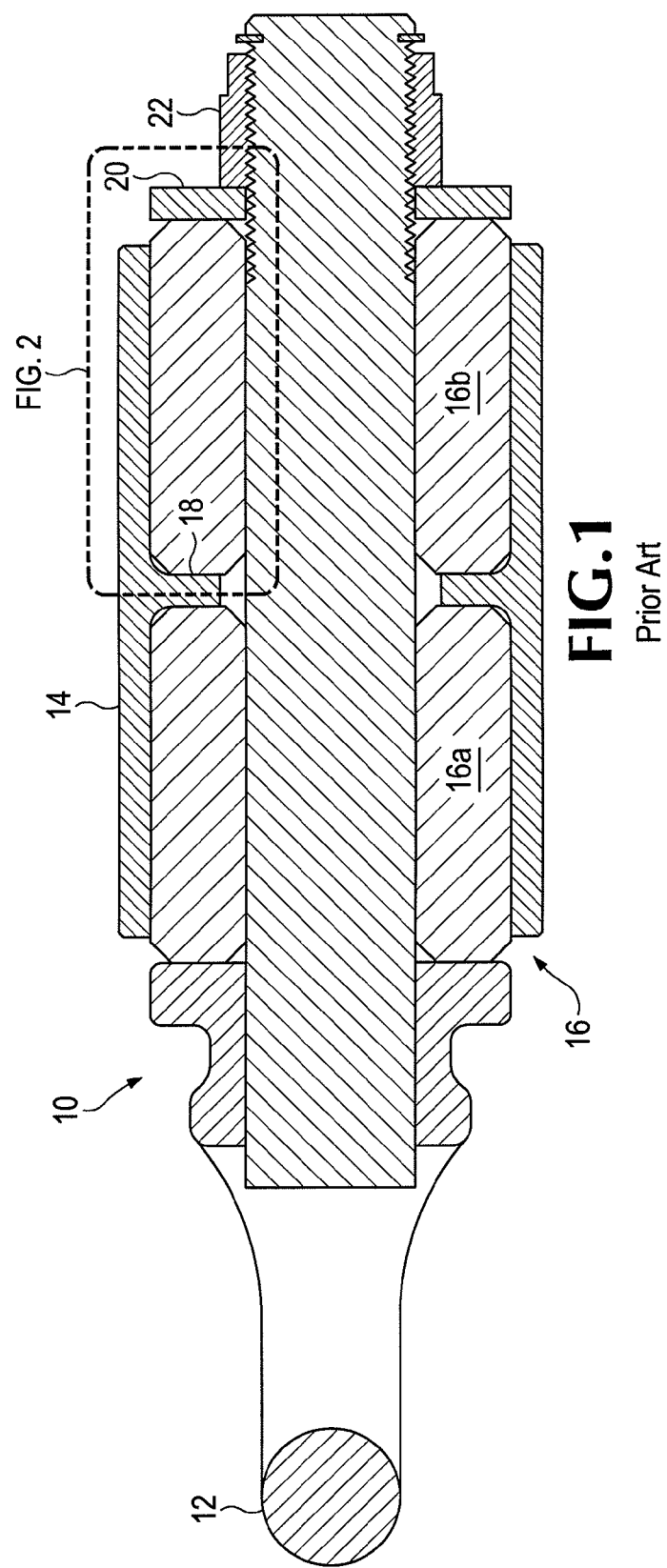
FIG. 1 is a cross-sectional view of a prior art drawbar assembly.
Figure 2:
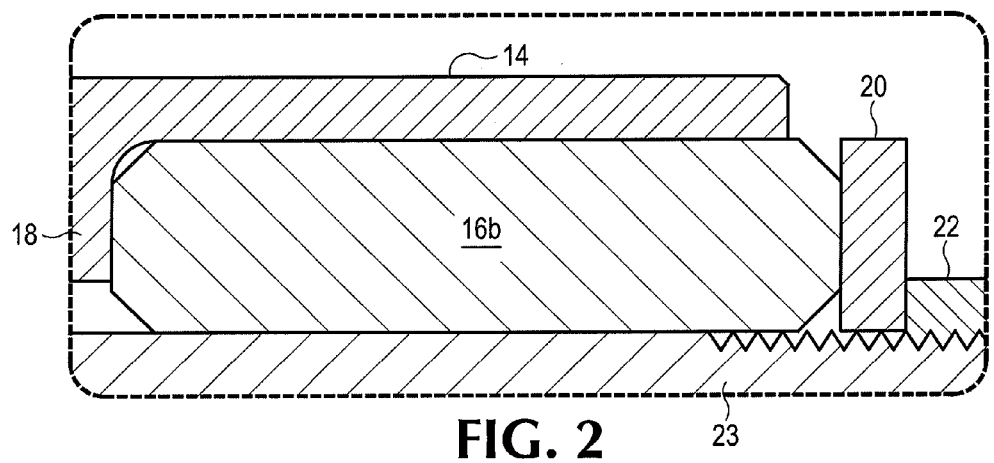
FIGS. 2 and 2A are detailed views of the prior art drawbar assembly showing its cushioning apparatus.
Figure 2A:
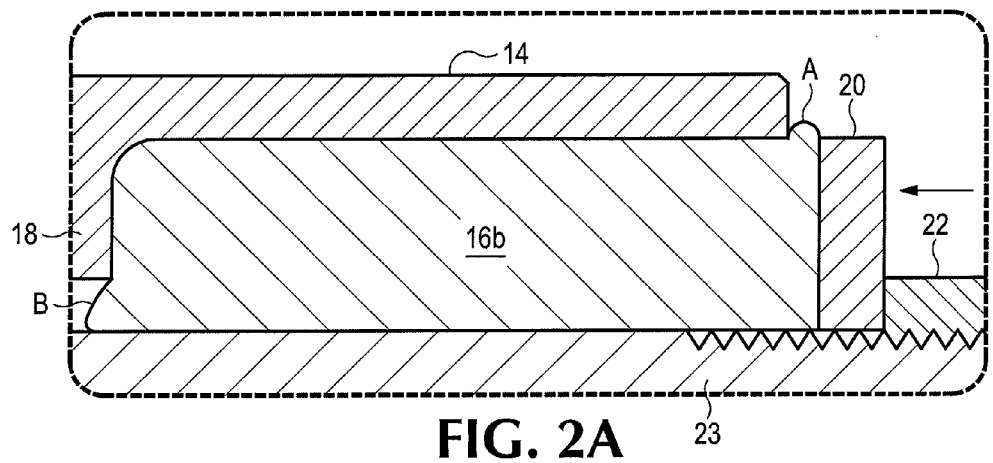
Figure 3:
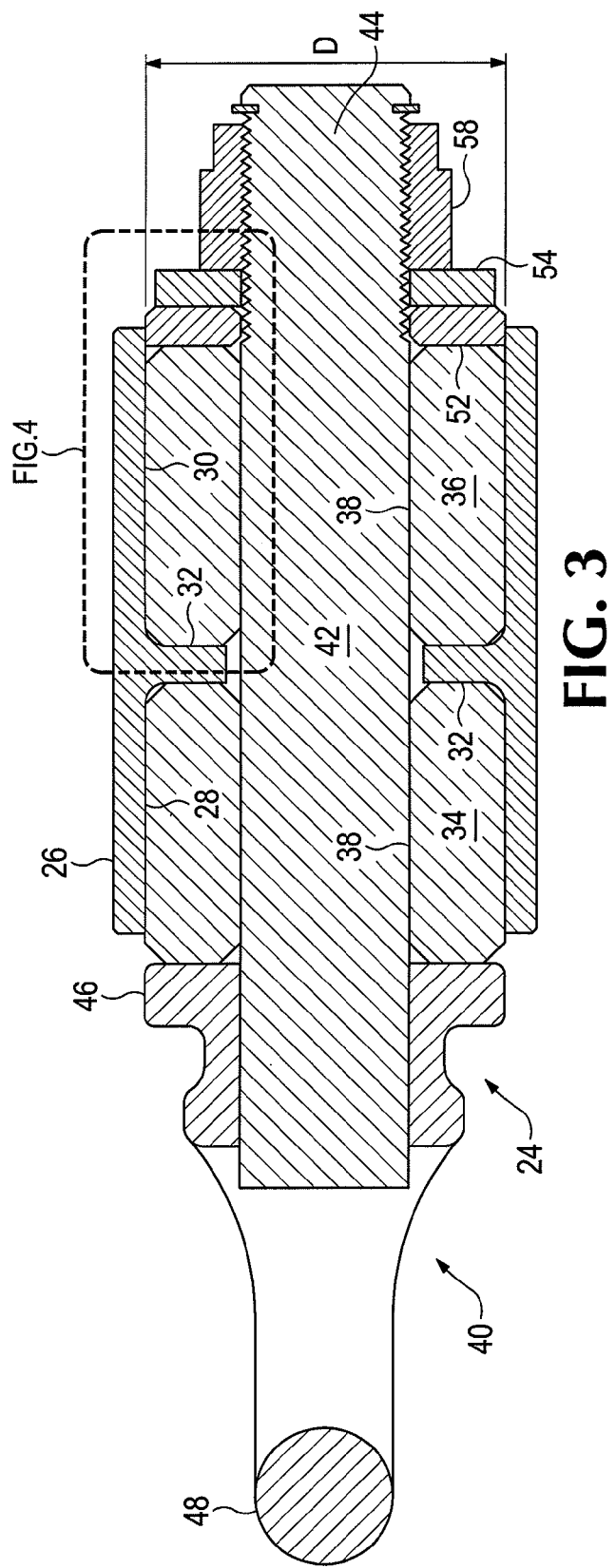
FIG. 3 is a cross-sectional view of a drawbar assembly embodying the subject invention.
Figure 4:
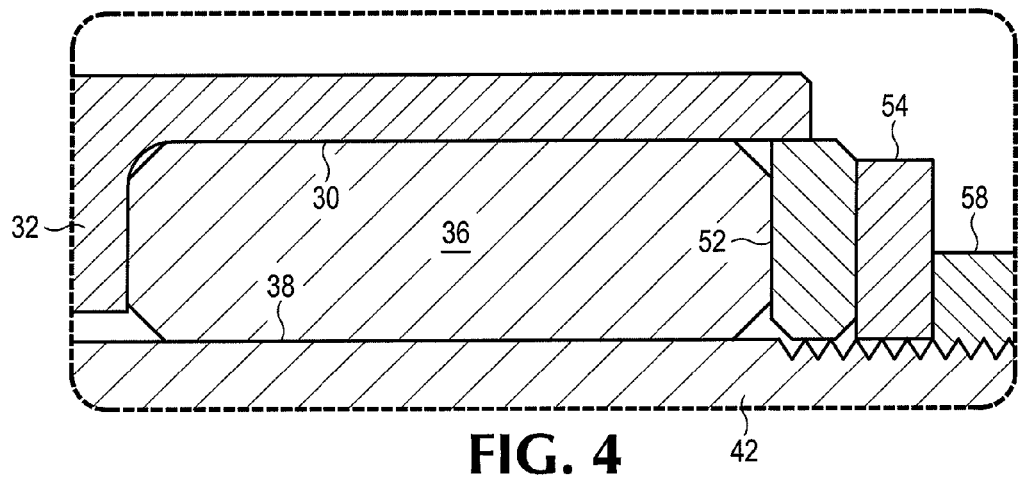
FIG. 4 is a detailed view showing the drawbar assembly of FIG. 3 in a relaxed position.

Referring now to FIG. 3, a trailer drawbar 24 includes a housing 26 having an outer cylindrical chamber 28 which opens out of the front end of the housing, an inner cylindrical chamber 30 which opens out of the rear end of the housing and an annular stop 32 located between the two chambers. The chambers are co-axially aligned and in the embodiment illustrated have the same inner diameter, D. The housing preferably is metal and can be a machined casting. The housing 26 is attached to a trailer (not shown) by conventional means. A first bushing 34 fits snugly in the outer chamber 28 and a second bushing 36 fits snugly in the inner chamber 30. The bushings are made from rubber or an elastomer that has a desired level of compressibility such that when in a relaxed position the first bushing 34 extends between the stop 32 and slightly beyond the end of the outer chamber 28. When in a relaxed position, the second bushing 36 extends between the stop 32 and a point slightly inside the end of the second chamber 30, FIG. 4. The bushings have aligned bores 38 extending through them.

A drawbar 40 includes an elongate cylindrical rod 42 with an outside diameter which allows it to fit tightly through the bores 38 in the bushings 34, 36. A first end of the rod 42 is attached to an annular base 46 which abuts the projecting end of the first bushing 34. A drawbar eye 48 is located forwardly of the base 46. The second end 44 of the rod 42 extends beyond the end of the second bushing 36 and is threaded. A first annular polymer seal 52 is placed over the rod 42 between the second bushing 36 and a metal washer 54. The first seal 52 is made from a semi-rigid polymer, or similar material that is sufficiently soft such that it will not damage the metal wall of the inner chamber 30, and has a diameter which allows it to fit into the inner chamber 30. A nut 58 is threaded onto the end 44 of the rod 42 and tightened until the base 46 is pulled against the first bushing 34 and the first seal 52 is pushed up against the second bushing 36.

Figure 4A:
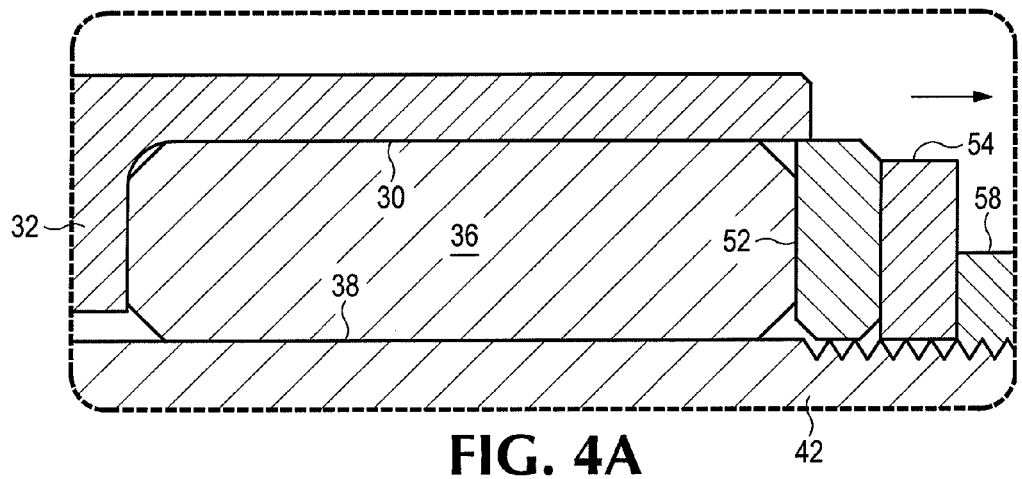
FIG. 4A is a detailed view of the drawbar assembly of FIG. 3 when it is loaded in the first direction.
Figure 4B:
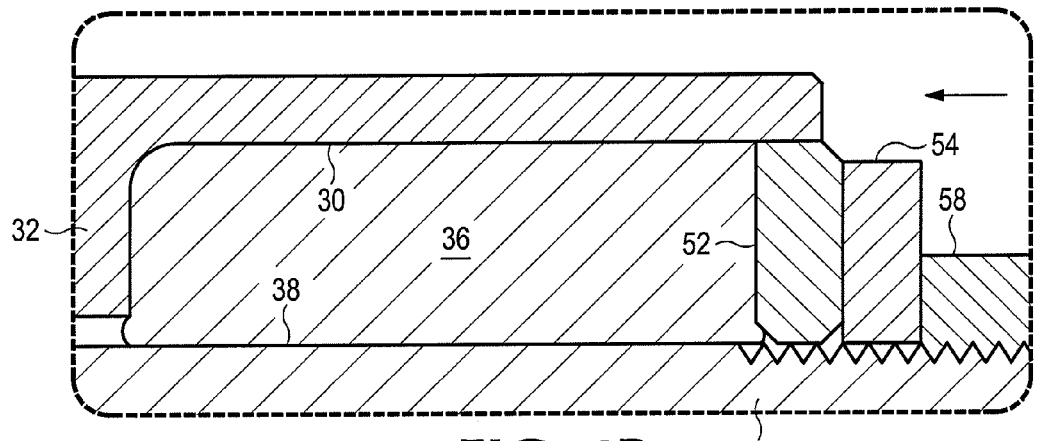
FIG. 4B is a detailed view of the drawbar of FIG. 3 when it is loaded in the opposite direction.

When a tractor is accelerating or pulling a trailer, and the drawbar 24 is pulled forwardly relative to the housing, the second bushing 36 is compressed. The second bushing has a length and a level of compressibility such that when the design maximum forward force is applied to the drawbar the second bushing is only compressed to a length where the metal washer 54 does not contact the housing, FIG. 4B.

When the tractor is decelerating, and the drawbar 24 is pushed rearwardly relative to the housing, the first bushing 34 is compressed. The first bushing has a length and a level of compressibility such that when the design maximum rearward force is applied to the drawbar the first bushing is compressed only to the point where the first seal 52 does not move completely out of the inner chamber 30, FIG. 4A. As a result the second bushing is never free to bulge out of the housing as it does in the prior art.

Figure 5:
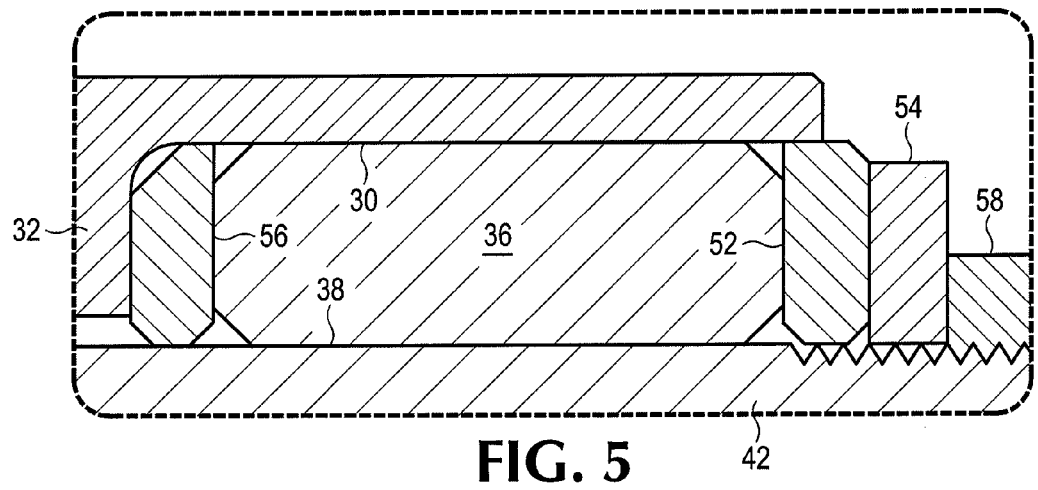
FIG. 5 is a detailed view of an alternate embodiment of the drawbar in a relaxed position.

In an alternate embodiment, shown in FIG. 5, a second polymer seal 56, similar to the first seal 52, is placed over the rod 42 between the stop 32 and the second bushing 36. Because the second seal 56 covers the gap between the rod 42 and the stop 32, the second bushing 36 cannot bulge out of the second chamber under the stop, as it does in the prior art.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A trailer drawbar comprising:
   (a) a housing having a cylindrical outer chamber and a cylindrical inner chamber separated from one another by a stop;
   (b) a first compressible bushing positioned in said outer chamber and a second compressible bushing positioned in said inner chamber, said first bushing having a first longitudinally extending bore and said second bushing having a second longitudinally extending bore, the first and second bores being aligned;
   (c) a cylindrical rod which extends through said bores;
   (d) said cylindrical rod having first and second ends, the first end of the cylindrical rod comprising an annular base that abuts one end of said first bushing in the outer chamber, the first end also having an eye; and wherein the second end is threaded;
   (e) said cylindrical rod having a length such that said second end extends out of said housing;
   (f) a first annular seal which fits over the second end of said rod and abuts said second bushing, said first annular seal having an outer diameter substantially equal to an inner diameter of said inner chamber;
   (g) a nut which threadingly engages said second end of said rod to hold said annular base against said first bushing and said first annular seal against said second bushing;
   (h) wherein said first bushing is compressible up to a first pre-determined level to a first bushing compressed state, the first bushing having a length and compressibility such that with the first bushing in the first compressed state said first annular seal remains partially within said inner chamber; and
   (i) wherein said second bushing is compressible up to a second pre-determined level to a second bushing compressed state, the second bushing having a length and compressibility such that, with the second bushing in the second bushing compressed state, said first seal is not located completely inside of said inner chamber.

2. The drawbar of claim 1 comprising a second annular seal which fits over said rod between said stop and said second bushing.

3. The drawbar of claim 2 wherein said first and second seals are made from a polymer.

4. The drawbar of claim 2 wherein said first and second seals are made from a semi-rigid polymer.

5. The drawbar of claim 1 wherein the first seal is made of a polymer material and further comprising a metal washer between the nut and the first seal, the metal washer being positioned outside of the inner chamber in compressed states of both the first and second bushings.

6. The drawbar of claim 1 comprising a second annular seal which fits over the second end of said rod and is positioned between said stop and said second bushing, and wherein the second annular seal is against the stop.

7. A trailer drawbar comprising:
   (a) a housing having a cylindrical outer chamber and a cylindrical inner chamber separated from one another by a stop;
   (b) a first compressible bushing which fits into said outer chamber and a second compressible bushing which fits into said inner chamber, said first bushing having a first longitudinally extending bore and the second bushing having a second longitudinally extending bore, the first and second bores being aligned;
   (c) a cylindrical rod which extends through said bores;
   (d) said cylindrical rod having first and second ends, the first end of the cylindrical rod comprising an annular base that abuts one end of said first bushing, the first end also having an eye, and wherein the second end is threaded;
   (e) said cylindrical rod having a length such that said second end extends out of said housing;
   (f) a first annular seal which fits over said rod and abuts said second bushing, said first annular seal having an outer diameter substantially equal to an inner diameter of said inner chamber;
   (g) a nut which threadingly engages said second end of said rod to hold said annular base against said first bushing first end and said first annular seal against said second bushing second end;
   (h) a washer positioned on the rod between the nut and the first annular seal;
   (i) wherein the first bushing is compressed from a first bushing first length to a first bushing compressed length that is shorter than the first bushing first length in response to movement of the annular base toward the stop, the second bushing being compressed from a second bushing first length to a second bushing second compressed length that is shorter than the second bushing first length in response to movement of the annular base away from the stop and movement of the nut toward the stop;
   said first bushing having a length and compressibility such that said first annular seal remains partially within said inner chamber with said first bushing positioned at the first bushing compressed length; and
   (k) said second bushing having a length and compressibility such that the washer is entirely outside of the inner chamber with said second bushing positioned at the second bushing second compressed length.

8. The drawbar system of claim 7 comprising a second annular seal which fits over said rod between said stop and said second bushing first end.

9. The drawbar system of claim 8 wherein said first and second seals are made from a polymer and the washer is of metal.

10. The drawbar system of claim 8 wherein said first and second seals are made from a semi-rigid polymer.

* * * * *